United States Patent
Meinen et al.

(10) Patent No.: US 9,733,146 B2
(45) Date of Patent: Aug. 15, 2017

(54) IMBALANCE MEASUREMENT MACHINE

(71) Applicant: Seichter GmbH, Hannover (DE)

(72) Inventors: Michael Meinen, Nordstemmen (DE); Max Seichter, Hannover (DE)

(73) Assignee: Seichter GmbH, Hannover (DE)

( * ) Notice: Subject to any disclaimer, the term of this patent is extended or adjusted under 35 U.S.C. 154(b) by 279 days.

(21) Appl. No.: 14/458,551

(22) Filed: Aug. 13, 2014

(65) Prior Publication Data

US 2015/0047432 A1    Feb. 19, 2015

(30) Foreign Application Priority Data

Aug. 15, 2013   (EP) .................................... 13180506

(51) Int. Cl.
| | |
|---|---|
| *G01M 1/02* | (2006.01) |
| *G01M 1/04* | (2006.01) |
| *B60S 5/04* | (2006.01) |
| *G01M 1/22* | (2006.01) |

(52) U.S. Cl.
CPC ............. *G01M 1/02* (2013.01); *B60S 5/04* (2013.01); *G01M 1/045* (2013.01); *G01M 1/225* (2013.01)

(58) Field of Classification Search
CPC ......... G01M 1/02; G01M 1/225; G01M 1/045
USPC .................................................... 73/462, 471
See application file for complete search history.

(56) References Cited

U.S. PATENT DOCUMENTS

| | | | | |
|---|---|---|---|---|
| 4,254,658 A | * | 3/1981 | Kogler ................... | G01M 1/06 73/462 |
| 6,131,455 A | * | 10/2000 | Matsumoto ........... | G01M 1/045 73/146 |
| 6,658,936 B2 | * | 12/2003 | Matsumoto ........... | G01M 1/045 73/460 |

(Continued)

FOREIGN PATENT DOCUMENTS

| | | |
|---|---|---|
| EP | 0 924 502 A2 | 6/1999 |
| EP | 1 746 400 A1 | 1/2007 |

OTHER PUBLICATIONS

Wikipedia entry for "Rolling-element bearing", downloaded from https://en.wikipedia.org/wiki/Rolling-element_bearing on Apr. 5, 2017; entry from the German Wikipedia for "Wälzlager" (in English—rolling bearing), downloaded from https://de.wikipedia.org/wiki/W%C3%A4lzlager on Apr. 5, 2017.

(Continued)

*Primary Examiner* — John Chapman, Jr.
(74) *Attorney, Agent, or Firm* — Collard & Roe, P.C.

(57) ABSTRACT

An imbalance measurement machine for determining tire imbalance has a hollow shaft rotatably driven relative to a fixed hollow axle. A tubular air feed for filling the tire with air is centered within and rotates with the shaft to rotate the tire for determining imbalance. An air hose is connected to a rotational coupling disposed at an air feed end that faces away from the tire. Force transducers between the axle and a machine bed measure forces that occur there during operation. The air hose is attached not only to the rotational coupling but also to the axle, at a distance from the rotational coupling. An alternative embodiment omits the rotational coupling and fills the tire in the resting state of the shaft, via the air hose and the non-rotating air feed. Subsequently, the air hose is separated from the air feed, and the tire retains the supplied air.

8 Claims, 2 Drawing Sheets

(56) References Cited

U.S. PATENT DOCUMENTS 7,340,947 B2 * 3/2008 Shinomoto ........... G01M 1/045
73/146

OTHER PUBLICATIONS

Wikipedia entry for "Ball bearing", downloaded from https://en.wikipedia.org/wiki/Ball_bearing on Apr. 5, 2017.
Wikipedia entry for "Spherical roller bearing", downloaded from https://en.wikipedia.org/wiki/Spherical_roller_bearing on Apr. 5, 2017.
Home page of the web site of the company Schaeffler, downloaded from http://medias.schaeffler.de/medias/de!hp.ec/1_R*0*C;bBuOv9Lx-2H_ on Apr. 5, 2017; English version downloaded from http://medias.schaeffler.de/medias/de!hp.ec/1_R*0*C;bBuOv9Lx-2H_?lang=en on Apr. 5, 2017.
Data sheet of Radial ball bearings 60..-2RSR produced by FAG, printed Feb. 6, 2007, pp. 1, 3, and 11.
Technical drawing of a four-point ball bearing constructed by Seichter GmbH, Feb. 2011.
THK Co. Ltd., "Kreuzrollenlager" catalog No. 382-3G, Jun. 2008, printed in Belgium, and English version "Cross-Roller Ring Series" catalog No. 382-3E, Jul. 2009, printed in Japan.
"Deep groove ball bearings, single row, with snap ring groove", technical drawing of SKF.
Seichter GmbH, "Process- and function description of the machine", Seichter Tire Testing Systems TIC[UG] Tire Inspection Center [Uniformity Geometry] [02], Hannover, Germany, Oct. 28, 2010.

\* cited by examiner

IMBALANCE MEASUREMENT MACHINE

CROSS REFERENCE TO RELATED APPLICATIONS

Applicant claims priority under 35 U.S.C. §119 of European Application No. 13 180 506.1 filed Aug. 15, 2013, the disclosure of which is incorporated by reference.

BACKGROUND OF THE INVENTION

1. Field of the Invention

The invention relates to an imbalance measurement machine.

2. Description of the Related Art

In the automotive industry, the manufacturers of motor vehicles set strict requirements for the quality of the vehicle tires used. Only those vehicle tires are permitted in which the imbalance of the vehicle tires, which can never be excluded, does not exceed a predetermined low value.

The manufacturers of vehicle tires must therefore test the vehicle tires that are produced as to whether or not they meet the predetermined low value. Vehicle tires with an overly great imbalance cannot be delivered to the motor vehicle manufacturers.

Measurement of the imbalance takes place with known imbalance measurement machines, which are structured in the manner of a spindle having a rotating part and a non-rotating part. The rotating part of the spindle is formed by a hollow shaft, which can be brought into rotation by means of a drive, and the non-rotating part of the spindle forms a hollow axle. The hollow shaft rotates relative to this hollow axle.

The vehicle tire that is to be measured for imbalance is attached to the shaft, which is not rotating yet, and then filled with air. For this purpose, a tubular air feed is provided centered relative to the hollow axle and the hollow shaft. The feed is connected with the shaft and rotates together with the shaft during the measurement of the imbalance.

At the end facing away from the vehicle tire, a rotational coupling is provided on the air feed, to which coupling an air hose for supplying the air required for filling the vehicle tire is connected. By means of the rotational coupling, it is possible to fill the vehicle tire with air when the shaft and the vehicle tire are already rotating. As a result, the duration of a complete measurement procedure can be kept low. Even while measuring the imbalance, the feed of air to the vehicle tire is maintained, so that it is possible to check the air pressure within the vehicle tire and to keep it constant. In many cases, electrical lines are therefore also connected with the rotational coupling, in addition to the air hose. These electrical lines are provided for an electrical circuit for regulation of the air pressure within the vehicle tire, in order to keep the air pressure constant while the imbalance is being measured.

Force transducers configured as sensors are situated between the hollow axle and the machine bed of the imbalance measurement machine. These sensors measure the forces between the hollow axle and the machine bed that occur during operation of the imbalance measurement machine. These forces are a measure of the imbalance.

The cause for the imbalance in a rotating vehicle tire is known to be attributable to an uneven mass distribution of the vehicle tire, i.e. the mass of the vehicle tire is not distributed with rotational symmetry. This uneven mass distribution leads to the result that the axis of rotation does not agree with the stable main axis of inertia of the vehicle tire, and that the axis of rotation is tilted in terms of its center of gravity.

When the vehicle tire is rotating, the imbalance brings about a bending moment on the axis of rotation, thereby causing circular vibrations displaced by 180° at the ends of the axis of rotation. The center of gravity of the vehicle tire remains at rest, in this connection, while the axis of rotation tumbles because of the vibrations. The forces that occur in this connection, which represent a measure of the imbalance, act on the force transducers and are measured by them.

In order to achieve the most precise possible measurement of the imbalance, only those forces that are exclusively generated by the imbalance of the vehicle tire should be recorded by the force transducers. In practice, however, it has been shown that this ideal case cannot generally be guaranteed. Because of the rotational coupling itself, and because of the air hose connected with the rotational coupling and because of the electrical lines additionally connected with the rotational coupling, if applicable, additional forces are introduced into the force transducers aside from the force that is caused by the imbalance. These forces influence and distort the measurement of the imbalance.

Because of these additional forces, the following can be observed in the known imbalance measurement machines. Different measurement values occur as a function of the angle at which the vehicle tire is attached to the shaft relative to a reference point to the shaft. If one represents these measurement values in Cartesian coordinates, at different angles distributed over 360°, one finds that the measurement values form a circle. The center point of this circle, however, is not the ideal center point of the coordinate system. Instead, the center point of the circle of the measured measurement values has a deviation from the ideal zero point of the coordinate system. The ideal zero point of the coordinate system occurs when the rotational coupling is not connected with the air feed, which can freely rotate together with the shaft, without any influence by outside forces. The deviation or zero point shift has different values for different tire types.

The deviation of the zero point occurs because in the measurement of the imbalance, not only the actual imbalance of the vehicle tire itself is measured. Instead, the measurement value is influenced by additional outside forces that are not caused by the vehicle tire but rather by the imbalance measurement machine itself. These outside forces mainly occur because the rotational coupling itself possesses an imbalance and stands in a fixed connection with the air hose and, if applicable, with electrical lines. The air feed therefore cannot rotate freely without any external influence. Instead, the rotational coupling has a true-running problem.

To counteract the true-running problem of the rotational coupling or to take the influence of the additional outside forces into consideration, in the known imbalance measurement machines the deviation of the zero point or the zero point shift is determined and documented for every vehicle tire type. This procedure is very complicated and takes about 30 minutes.

It is a further disadvantage that the zero point shift must be carried out separately for every new vehicle tire type. Furthermore, specific changes in the imbalance measurement machine require an immediate re-determination of all the correction values (zero point shifts). A further disadvantage is that the time-consuming determination of the correction values significantly restricts the availability of the imbalance measurement machine for the actual imbalance measurement.

If the zero point shift has been determined and is known for one vehicle tire type, measurement of the imbalance can take place using the known imbalance measurement machines. The correction value (zero point shift) assigned to the vehicle tire type in question is deducted from the resulting measurement value, and the correspondingly corrected measurement value approximately corresponds to the actual properties of the vehicle tire and reproduces the imbalance. It is easily evident that the determination of the imbalance in the known imbalance measurement machines is complicated and cost-intensive when using this method of procedure.

SUMMARY OF THE INVENTION

The invention is based on the task of creating an imbalance measurement machine for determining the imbalance of vehicle tires in which the complicated correction measures described above (determination of the zero point shift and subsequent correction of the measurement value) are no longer required, and which machine is available for a determination of imbalance, without restrictions.

The solution for this task occurs by an imbalance measurement machine for determination of the imbalance of vehicle tires in accordance with the invention. The machine has a hollow shaft that can be brought into rotation by means of a drive. The shaft forms the rotating part of a spindle and rotates relative to a hollow axle that represents the non-rotating part of the spindle. A tubular air feed is provided for filling the vehicle tire with air. The feed is disposed centered within the spindle and connected with the shaft, and rotates together with the shaft. The vehicle tire is driven by the shaft and put into rotation in order to determine its imbalance. A rotational coupling is disposed at the end of the air feed that faces away from the vehicle tire, to which an air hose and, if applicable, also electrical lines are connected and attached. Force transducers for measuring the forces between the hollow axle and the machine bed that occur during operation of the imbalance measurement machine are situated between the hollow axle and the machine bed of the imbalance measurement machine. The air hose that leads to the rotational coupling and, if applicable, the electrical lines that lead to the rotational couple are attached not only to the rotational coupling but also to the hollow axle at a distance from the rotational coupling.

According to one aspect of the invention, the air hose that leads to the rotational coupling is attached, and if applicable, the electrical lines that lead to the rotational coupling are attached as well, not only to the rotational coupling itself but also to the hollow axle, at a distance from the rotational coupling.

The invention proceeds from the assumption that only the first harmonic of vibrations is a problem for the force introduction of the outside forces into the force transducers, because in the imbalance measurement, as well, only the first harmonic of the force of the vibration caused by the imbalance is evaluated. In this regard, the imbalance of the vehicle tire and the force introduction that is caused by the rotational coupling are not differentiated.

The central idea of the invention consists in that the proportion of the first harmonic of the force introduction caused by the rotational coupling is eliminated. The attachment or support of the air hose (and, if applicable, of the electrical lines) on the hollow axle practically brings about a "short-circuit" with regard to the force that results from the rotational coupling. The forces that result from the true-running problem of the rotational coupling now no longer flow through the force transducers and are therefore not visible in the determined measurement value of the imbalance. As a result, the imbalance can be determined in error-free manner.

Although in the case of the known imbalance measurement machines the imbalance is determined in that the zero point shift is deducted from the measured measurement value, in the case of the invention, the disruptive outside forces are eliminated, so that these forces are not present in the determined measurement value. A correction of the determined measurement value is therefore not necessary.

A further advantage of the invention is that this elimination of disruptive outside forces holds true for all the different tire types. In addition, it is also advantageous that the invention enables unrestricted use of the imbalance measurement machine because a determination of correction values (zero point shifts) is not required. All these advantages are achieved, in surprising manner, by the simple measure according to the invention of supporting the air hose and the electrical lines on the non-rotating part of the spindle, on which the force transducers are mounted.

A practical embodiment of the invention provides that the hollow axle extends within the hollow shaft, which rotates about the hollow axle, outside of it.

In comparison with known imbalance measurement machines, in which the shaft rotates within the hollow axle, the imbalance measurement machine according to the invention can be produced in simple and cost-advantageous manner.

Another advantageous further development of the invention mounts the force transducers on an underside of a plate at the lower end of the hollow axle between the plate and the machine bed. The air hose and, if applicable, the electrical lines are attached to the plate, on one side, on the outside, by a holding element.

This measure makes optimal placement of the force transducers possible, along with simple attachment of the air hose and, if applicable, the electrical lines, on the non-rotating part of the axle.

According to another practical embodiment of the invention, the plate is configured as a rectangle, and four force transducers are provided at the corner points of the plate, symmetrically to the hollow axle.

In another aspect, the solution of the task according to the invention is accomplished by an imbalance measurement machine for determination of the imbalance of vehicle tires having a hollow shaft that can be brought into rotation by means of a drive and that forms the rotating part of a spindle and rotates relative to a hollow axle that represents the non-rotating part of the spindle, as well as having a tubular air feed that is provided for filling the vehicle tire with air and is disposed centered within the spindle and connected with the shaft, and rotates together with the shaft. The vehicle tire is driven by the shaft and put into rotation, in order to determine its imbalance. The air feed can be connected with an air hose. Force transducers for measuring the forces between the hollow axle and the machine bed that occur during operation of the imbalance measurement machine are provided between the hollow axle and the machine bed of the imbalance measurement machine. The vehicle tire is filled by way of the air hose and by way of the non-rotating air feed in the resting, non-rotating state of the shaft and of the vehicle tire. The air hose is separated from the air feed after the vehicle tire has been filled. The air supplied does, however, remain in the vehicle tired.

This solution is based on the idea to avoid influencing and distorting the measurement value for the imbalance by preventing the occurrence of outside forces caused by the true-running problem of the rotational coupling right from the start, in that the use of a rotational coupling is refrained from. Filling of the vehicle tire takes place before measuring the imbalance, and before the shaft and the vehicle tire are put into rotation. The air feed and the shaft can subsequently rotate without the influence of external outside forces, during the measurement procedure, whereby it is ensured that the air previously supplied remains in the vehicle tire. The measurement value then determined is therefore attributable exclusively to the forces caused by the imbalance and represents the imbalance without error.

In an advantageous further development of the invention, it is provided that a kick-back valve is disposed in the air feed, which prevents air from escaping out of the vehicle tire after the air hose has been removed from the rotational coupling.

By this measure, it is ensured that the air remains in the vehicle tire during the measurement, although the air hose was removed from the rotational coupling.

BRIEF DESCRIPTION OF THE DRAWING

Other objects and features of the present invention will become apparent from the following detailed description considered in connection with the accompanying drawing. It is to be understood, however, that the drawing is designed as an illustration only and not as a definition of the limits of the invention.

In the drawings.

DETAILED DESCRIPTION OF PREFERRED EMBODIMENTS

Figure 1:
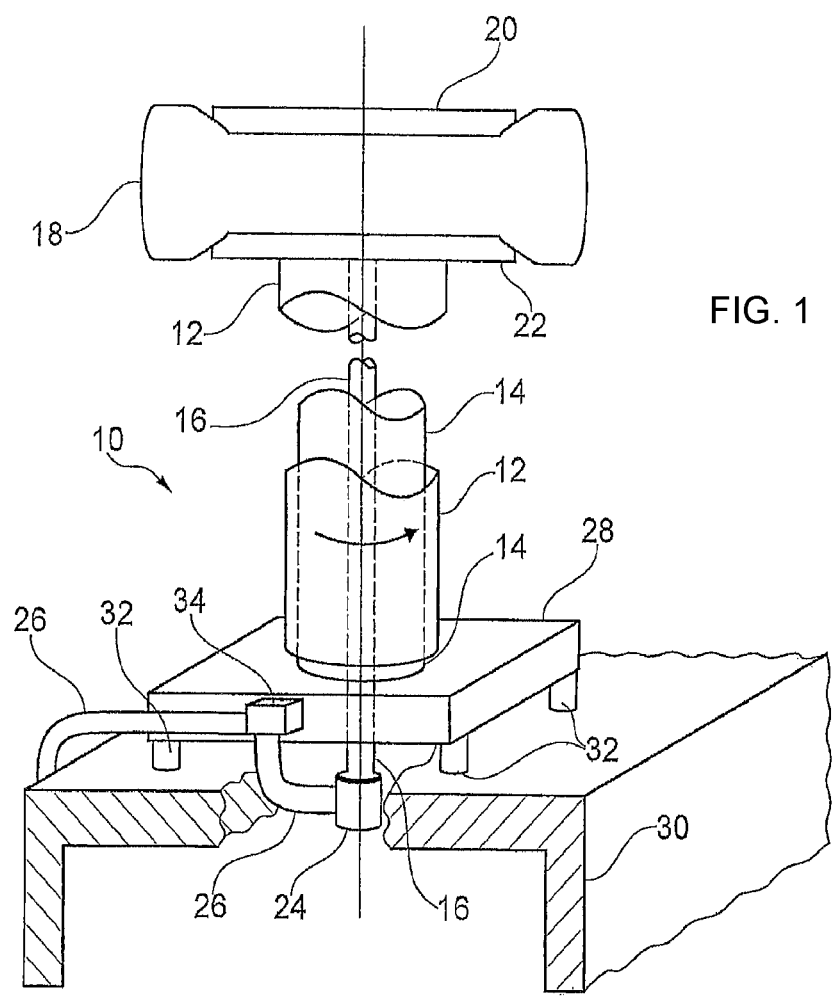
FIG. 1 is a partial and schematic cross-sectional view of an exemplary embodiment of the invention.

Referring now in detail to the drawing, the imbalance measurement machine 10 comprises a hollow axle 14 around which a rotating hollow shaft 12 is situated, which shaft can be put into rotation by a drive, not shown. At the upper end of the hollow shaft 12, a vehicle tire 18, the imbalance of which is supposed to be measured, is braced onto the shaft 12 in known manner, using two rim plates 20 and 22.

A centered air feed 16 is provided for filling the vehicle tire 18, which feed is firmly connected with the shaft 12 and rotates with it. A rotational coupling 24 is disposed at the lower end of the air feed 16, to which coupling the one end of an air hose 26 is connected, and the other end of which coupling is connected with a compressed air generator, not shown. The rotational coupling 24 makes it possible to maintain the air feed even when the shaft 12 is rotating and the air feed 16 is rotating with it, and to keep the air pressure in the vehicle tire 18 constant.

The hollow axle 14 ends, at its lower end, with a rectangular plate 28 that is an integral part of the hollow axle 14. Below the plate 28, there is a machine bed 30 of the imbalance measurement machine 10, and four force transducers 32 are disposed at the corner points of the plate 28, between the plate 28 and the surface of the machine bed 30 that runs parallel to it. The forces that occur between the plate 28 and the machine bed 30 when the shaft 12 is rotating and the vehicle tires 18 are rotating are measured with these force transducers 32, in known manner.

The rim plates 20, 22 are precise components that are precisely balanced before their use, so that they possess only a minimal, just barely permissible inherent imbalance or, in an ideal case, no imbalance at all. This feature is important because if at all possible, only those forces that are generated by the imbalance of the vehicle tire 18 itself should be measured by the force transducers 32, in order to achieve the most error-free possible measurement of the imbalance of the vehicle tire 18. Additional forces that result from an imbalance of the rim plates 20, 22 would distort the measurement result.

According to an embodiment of the invention, the air hose 26 that leads to the rotational coupling 24 is attached not only to the rotational coupling 24 itself, but additionally to the plate 28, at a distance from the rotational coupling 24. For this purpose, a holding element 34 is provided on the one side of the hollow plate 28, with which element the air hose can support itself on the plate 28. By this measure, the proportion of the first harmonic of the force introduction into the force transducers that is caused by the rotational coupling 24 when the shaft 12 is rotating and when the vehicle tire 18 is rotating is eliminated. The forces that occur due to the true-running problem of the rotational coupling 24 thus do not flow through the force transducers and are therefore also not visible in the determined measurement value of the imbalance, which can now be determined without error and without any external influence.

Figure 2:
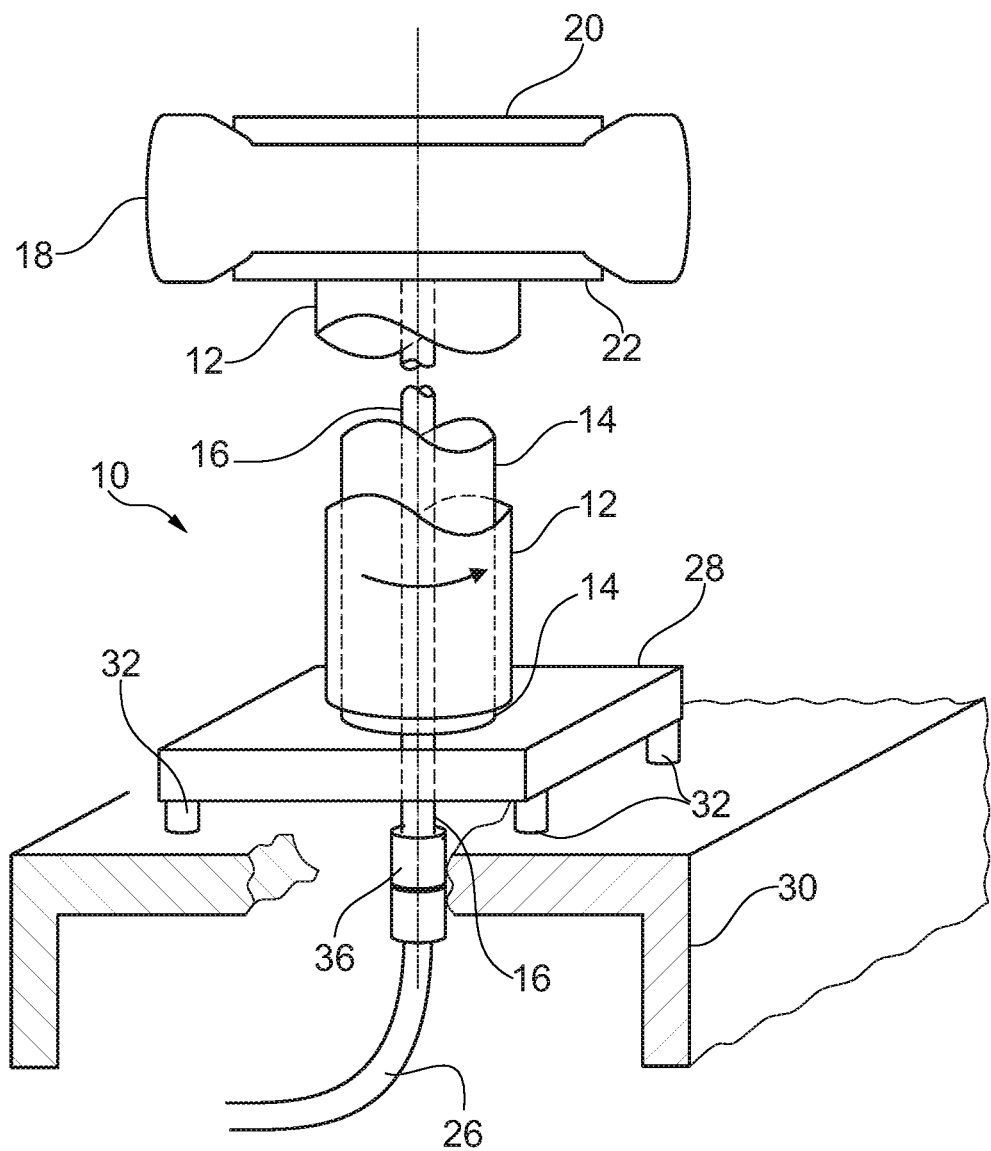
FIG. 2 is a partial schematic cross-sectional view of another exemplary embodiment of the invention.

According to another solution proposal of the invention shown in FIG. 2, the imbalance can also be measured without error and without any external force influence in that use of a rotational coupling 24 is refrained from, and that the vehicle tire 18 is filled by way of the air feed 16 in the resting, non-rotating state of the shaft 12 and of the vehicle tire 18, and that the air hose 26 is separated from the air feed 16 after the vehicle tire 18 has been filled, whereby the air supplied to the vehicle tire 18 does, however, remain in the vehicle tire 18. Subsequently, the shaft 12 is then driven and put into rotation, thereby then also causing the air feed 16 and the vehicle tire 18 to rotate.

If the air hose 26 is separated from the air feed 16 before the shaft 12 is put into rotation, and if thereby the air feed to the vehicle tire 18 is completely inhibited, the shaft 12 with the air feed 16 can rotate without any influence from outside forces, because no rotational coupling 24 is present. The forces measured by the force transducers 32 are then only attributable to the imbalance of the vehicle tire 18.

In order to ensure that no air escapes from the vehicle tire 18 when the air hose 26 has been removed from the air feed 16, a kick-back valve 36 is disposed within the air feed 16.

Although only a few embodiments of the present invention have been shown and described, it is to be understood that many changes and modifications may be made thereunto without departing from the spirit and scope of the invention.

What is claimed is:

1. An imbalance measurement machine for determining imbalance of a vehicle tire comprising:
   a) a spindle comprising a rotatable part and a non-rotatable part, wherein the rotatable part comprises a rotatably driven hollow shaft and the non-rotatable part comprises a hollow axle, the hollow shaft rotating relative to the hollow axle during an operating state of the shaft;
   b) a tubular air feed for filling the vehicle tire with air, wherein the air feed is disposed centered within the spindle, is connected with the hollow shaft and rotates together with the hollow shaft during the operating state, and wherein the vehicle tire is driven by the hollow shaft and put into rotation during the operating state in order to determine the imbalance of the vehicle tire;
c) a rotational coupling disposed at an end of the air feed facing away from the vehicle tire during the operating state;
d) an air hose;
e) a machine bed; and
f) a plurality of force transducers situated between the hollow axle and the machine bed for measuring forces between the hollow axle and the machine bed during the operating state;
wherein the air hose is connected to the rotational coupling and to the hollow axle at a distance from the rotational coupling.

2. The imbalance measurement machine according to claim 1, further comprising a plurality of electrical lines connected to the rotational coupling and to the hollow axle.

3. The imbalance measurement machine according to claim 2, wherein the hollow axle has a plate at a lower end of the hollow axle, wherein the force transducers are mounted on an underside of the plate between the hollow axle and the machine bed, and wherein the air hose and the electrical lines are attached to a side of the plate by a holding element.

4. The imbalance measurement machine according to claim 1, wherein the hollow axle extends within the hollow shaft and the hollow shaft rotates about and outside of the hollow axle during the operating state.

5. The imbalance measurement machine according to claim 1, wherein the hollow axle has a plate at a lower end of the hollow axle, wherein the force transducers are mounted on an underside of the plate between the hollow axle and the machine bed, and wherein the air hose is attached to a side of the plate by a holding element.

6. The imbalance measurement machine according to claim 5, wherein the plate is configured as a rectangle, and wherein four force transducers are provided at corner points of the plate, symmetrically to the hollow axle.

7. An imbalance measurement machine for determining imbalance of a vehicle tire comprising:
a) a spindle comprising a rotatable part and a non-rotatable part, wherein the rotatable part comprises a rotatably driven hollow shaft and the non-rotatable part comprises a hollow axle, the hollow shaft rotating relative to the hollow axle during an operating state of the shaft;
b) a tubular air feed for filling the vehicle tire with air, wherein the air feed is disposed centered within the spindle, is connected with the hollow shaft and rotates together with the hollow shaft during the operating state, and wherein the vehicle tire is driven by the hollow shaft and put into rotation during the operating state in order to determine the imbalance of the vehicle tire;
c) an air hose connected with the air feed;
d) a machine bed; and
e) a plurality of force transducers situated between the hollow axle and the machine bed for measuring forces between the hollow axle and the machine bed during the operating state;
wherein in a resting, non-rotating state of the shaft and of the vehicle tire, the vehicle tire is fillable by way of the air hose and by way of the air feed; and
wherein after the vehicle tire has been filled with air, the air hose is separable from the air feed and the air supplied remains in the vehicle tire.

8. The imbalance measurement machine according to claim 7, further comprising a kick-back valve provided in the air feed, wherein the kick-back valve is configured to prevent the air from escaping out of the vehicle tire after the air hose has been removed from the air feed.

* * * * *